W. H. NORDHAUS.
TABLE FOR PASTING STORAGE BATTERY PLATES.
APPLICATION FILED MAY 21, 1920.
1,401,181.
Patented Dec. 27, 1921.
3 SHEETS—SHEET 2.
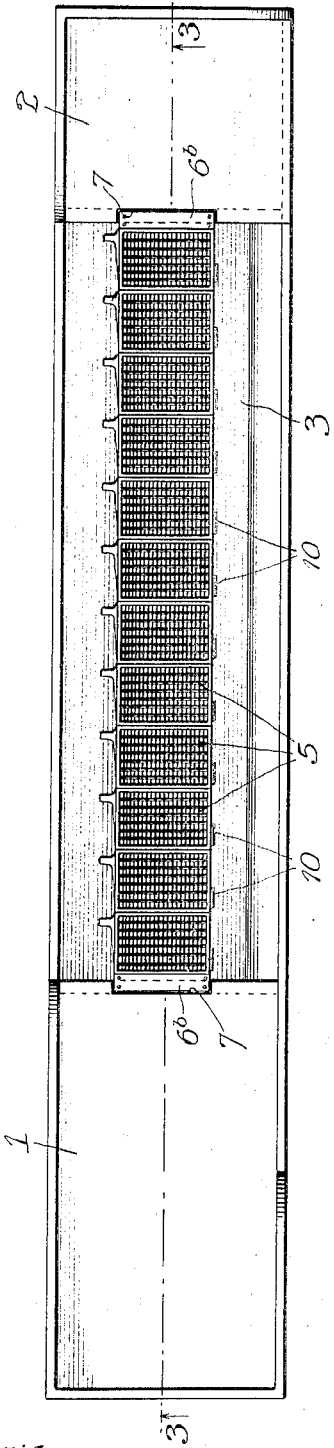
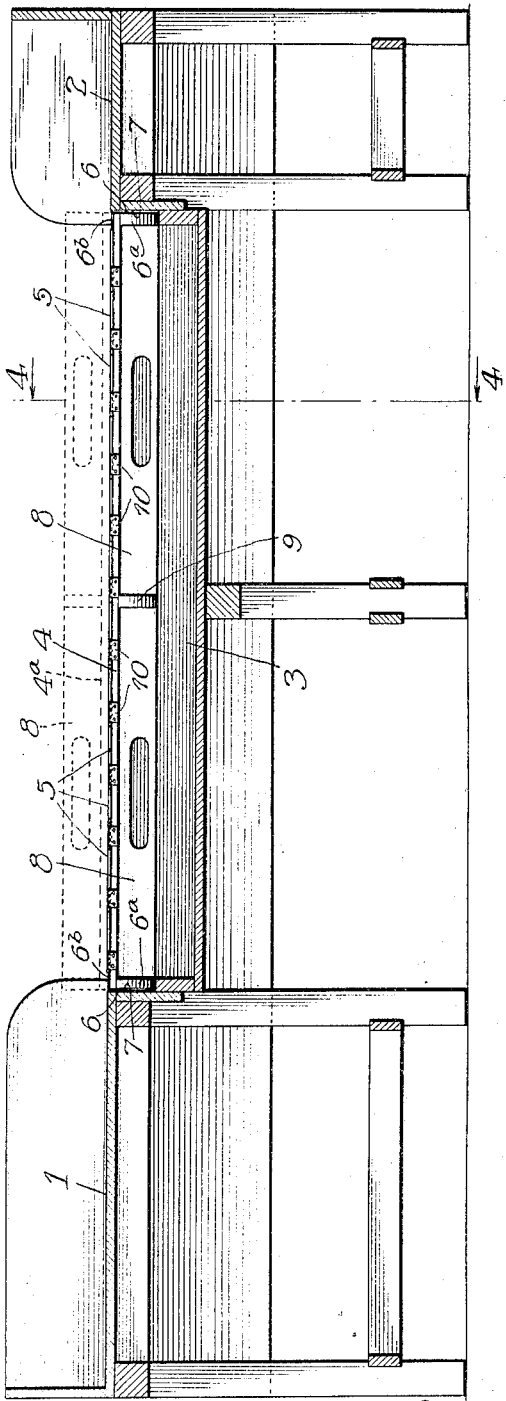

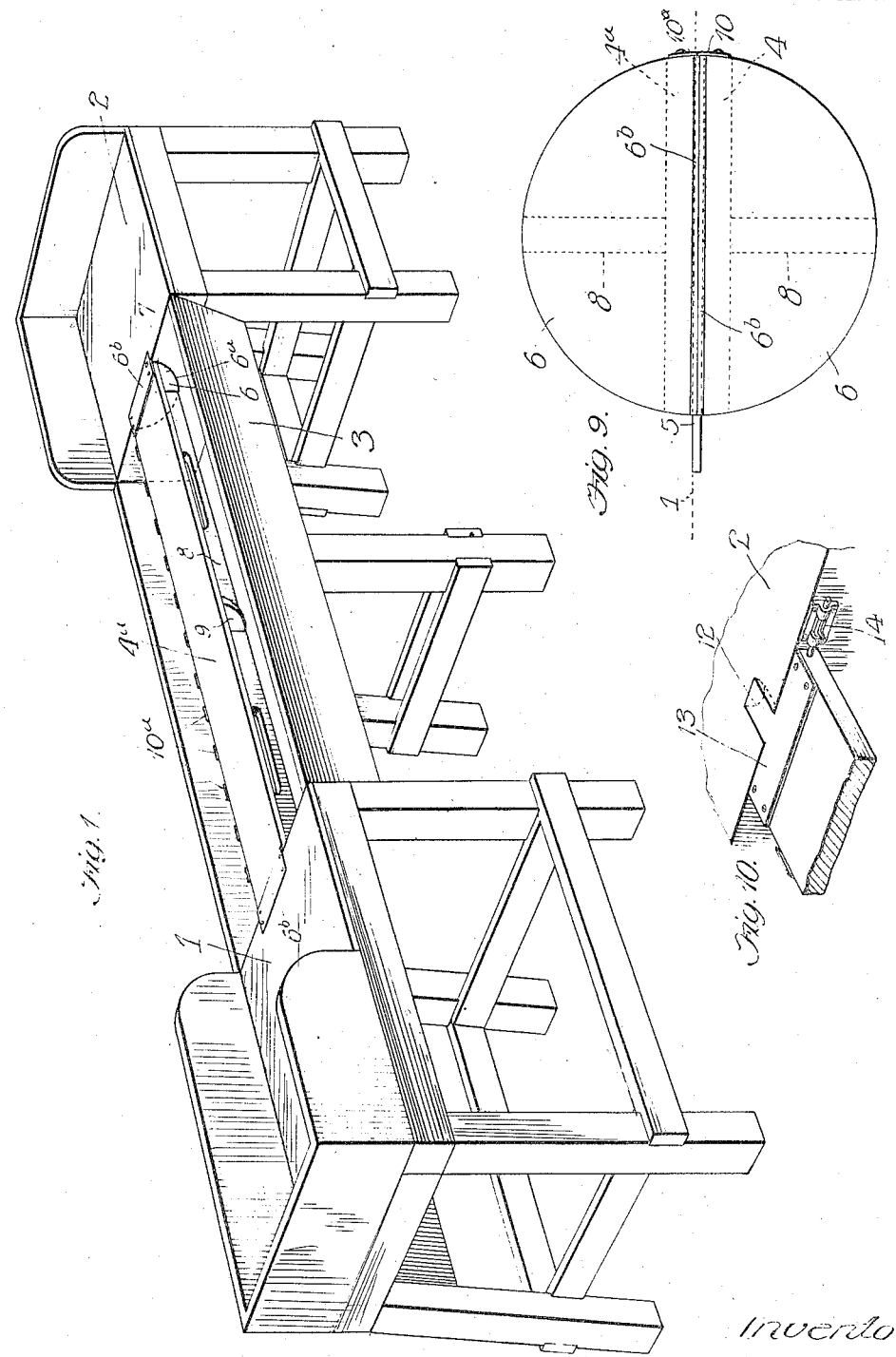

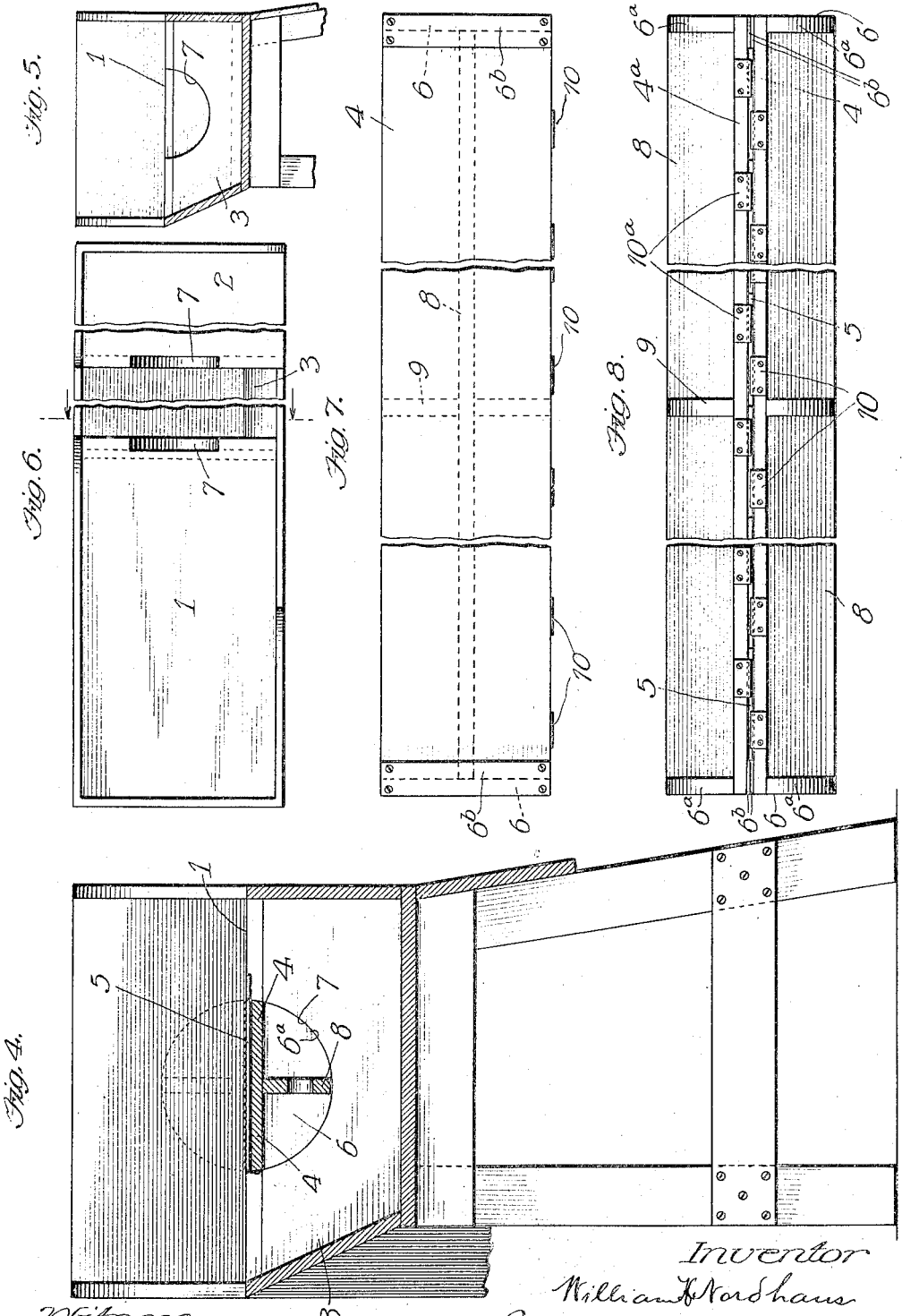

UNITED STATES PATENT OFFICE.

WILLIAM H. NORDHAUS, OF CHICAGO, ILLINOIS, ASSIGNOR TO K. W. BATTERY COMPANY, OF CHICAGO, ILLINOIS, A CORPORATION OF ILLINOIS.

TABLE FOR PASTING STORAGE-BATTERY PLATES.

1,401,181.   Specification of Letters Patent.   Patented Dec. 27, 1921.

Application filed May 21, 1920. Serial No. 383,273.

*To all whom it may concern:*

Be it known that I, WILLIAM H. NORDHAUS, a citizen of the United States, residing at Chicago, in the county of Cook and State of Illinois, have invented certain new and useful Improvements in Tables for Pasting Storage-Battery Plates, of which the following is a specification.

My invention relates to a table designed to facilitate the filling or pasting of lead grids, or grids composed of an alloy of lead and other metals such as are used in the construction of electric storage batteries, with the paste which forms their active material. This paste, in the form of a moist plastic material composed mainly of red lead, litharge, and usually some other ingredients, according to the particular formula employed, and capable of being worked by hand into a coherent mass in the grid openings, is applied to the grids, first to one side and then to the other, the surplus paste being struck off by a suitable straight-edged blade or pasting knife and the operation being carried out in such manner as to completely fill the grid openings and leave a smooth surface on each side flush with metal of the grid. The usual practice in pasting plates is to lay down a row of grids on a smooth table; then rub or force the material into the grid openings and strike off the surplus material from the upper surface; then apply to each pasted face a sheet of paper the same size as the plate, then reverse the plates one by one; then repeat the filling operation on the other side; and finally strip off the paper and stack the plates one by one on a drying rack. The object of my present invention is to provide an apparatus by means of which this work may be carried on with greater rapidity than is possible in the manner just described, with consequent decrease in the cost of the labor necessary to produce a given number of plates. To this end I have devised and invented the novel table hereinafter described and which is illustrated in the accompanying drawings, the essential elements of my invention being recited in the appended claims, it being understood, however, that various modifications in the form and arrangements of parts and the substitution of equivalent elements for those described are possible, without departing from the spirit of my invention or the scope of the claims.

Of the drawings, Figure 1 is a perspective of the table showing one rotatable plate support in position to receive a row of plates; Figs. 2 and 3 are respectively a plan view and a side view of the same; Fig. 4 is a cross-section on the line 4—4 of Fig. 3; Fig. 5 is a fragmentary section in the same plane, but without the plate support in place; Fig. 6 is a plan view of the table with a portion of the center broken away; Fig. 7 is a broken top view of the plate support; Fig. 8 is a side view of the two plate supports arranged face to face in position to be rotated; Fig. 9 is an end view of the same; and Fig. 10 a perspective of a modified form of end bearing for the plate support.

The same reference characters indicate the same parts in all of the figures of the drawings.

The different parts of the frame work of my novel table may be formed of wood or any suitable structural material united and secured together by suitable means to produce a substantial, rigid structure. At one end of the frame is arranged a supply table 1, provided at the rear and end and part of the front side with marginal vertical flanges and adapted to receive a supply of the paste used for filling the grids. At the other end of the frame a plate table 2 is provided to receive drying racks upon which the filled plates may be stacked, to be removed from time to time as they accumulate. Intermediate the two tables, above a waste trough or hopper 3 connecting the tables 1 and 2 and forming part of the frame work of the device, is arranged a rotatable plate support 4, recessed to receive the grids 5 and adapted to receive a similar support 4ª placed face downwardly upon it so that the two supports and interposed grids may be rotated together through an angle of 180°. In using the filling table the support 4 will be removed after the two supports have been rotated, and the support 4ª will then occupy the position and take the place formerly occupied by the support 4. To adapt the supports to be thus operated, they are each provided with semicircular end bearings 6 adapted to rest in semicircular seats 7 formed in the ends of the waste trough. These end bearings, in the present instance, comprise curved end blocks 6ª, the end portions of the support member 4 and plates 6ᵇ secured to the top of the support, such plates being half the thickness of the grids to be filled and in the present instance being formed of metal and having their top surface lying flush with the surface of the tables 1 and 2 in a horizontal plane extending diametrically through the axis of the bearing and of the seat 7. The surface of the support 4 consequently forms the bottom of a shallow recess extending between the two plates 6ᵇ, and is of such length as to receive the desired number of grids,—twelve in the table shown in the drawings. This specific construction of the end bearings, however, while convenient and desirable, is not essential to my invention and the parts of such bearings may be made integral or differently formed and secured together in the relationship described. In order to give strength and rigidity to the supports, they are each provided with a bottom longitudinal rib 8 extending between the end blocks 6ᵇ, and brackets 9 are interposed in the angles between the rib 8 and the support. One edge of each of the supports 4 and 4ᵃ is provided with a series of stops, marked 10 and 10ᵃ respectively, the two series being staggered and so spaced that when the supports are arranged face to face each grid may abut against both a stop 10 and a stop 10ᵃ. These stops are preferably somewhat less in height than the thickness of the grids in order to prevent interference with the knife or scraper in striking off surplus material. If not more than half the thickness of the grid they may be opposite each other, and not staggered, as shown and above described.

Constructed as above described, the manner in which the lead grids are pasted to form battery plates is as follows: One of the two supports, as for instance the support 4, being placed in the seats 7, a row of grids is arranged on its recessed top surface, as best shown in Fig. 2. The grids are now pasted with material taken from the supply table 1, and the surplus material struck off with the pasting knife, falling into the waste hopper 3, and a single sheet of paper of the proper size to cover all the grids is placed on top of the row. The support 4ᵃ is now placed face down on top of the support 4, in the position shown in dotted lines in Figs. 3 and 4, and the two supports now rotated together toward the workman, that is in such manner that the stops 10 and 10ᵃ will travel downwardly during the first quarter revolution and then upwardly, in which position they will prevent the grids from falling out of their seats. When the grids are brought into horizontal position again with their uncoated sides uppermost, the support 4 is removed and the paste is applied to the uncoated side of the grids and the surplus material struck off as before, and the filled plates then lifted one by one, a section of the paper shearing off at the edge of each plate as it is lifted and being lifted with it, and these sections of paper being then removed the plates are stacked in a suitable drying rack on the plate table 2. The succeeding operation is conducted in the same manner, except that the supports and plates are rotated in the opposite direction, in order that the stops may travel first downwardly and then upwardly and support the plates during the reversing operation.

If desired, both sides of the supports may be provided with stops, in which case the supports may be rotated in either direction. In such case it will be necessary that the stop shall be so located as to avoid interference with the connecting tongues which ordinarily project from one corner of the grids.

The bearing surface of the supports constructed as above described and as illustrated in the drawings has been found in practice to afford sufficient frictional resistance in turning to make them stable, but if desired, locking means may be provided to restrain them from rotation while the plates are being pasted, in which case the bearing blocks may have a relatively small bearing portion and be made as nearly frictionless as practicable. In Fig. 10 I have shown such a modification of my invention, the semi-cylindrical journal 12 of the bearing being formed as an integral portion of the end plate 13 of the support, and a sliding bolt 14 provided for the purpose of locking the support in working position.

I claim:

1. In a pasting table, a rotatably mounted removable support for the plates having semicircular end pivot members, and a similar removable support arranged to be placed face to face upon said first mentioned support and to be rotated into the position first occupied by said first mentioned support, said pivot members of the supports being arranged to seat in semicircular bearings in the frame of the table.

2. In a pasting table, a rotatably mounted removable support for the plates, and a similar removable support arranged to be placed face to face upon said first mentioned support and to be rotated into the position first occupied by said first mentioned support, said supports being provided with staggered stops arranged to support the plates while being rotated.

3. In a pasting table, a rotatably mounted removable support for the plates, and a similar removable support arranged to be placed face to face upon said first mentioned support and to be rotated into the position first occupied by said first mentioned support, said supports being provided with stops arranged to overlap the edges of plates interposed between the supports.

4. In a pasting table, a rotatably mounted removable support for the plates, and a similar removable support arranged to be placed face to face upon said first mentioned support and to be rotated into the position first occupied by said first mentioned support, said supports being provided at their ends with semicircular end blocks arranged to be rotated together in semicircular seats in the frame of the table.

5. In a pasting table, a rotatably mounted removable support for the plates, and a similar removable support arranged to be placed face to face upon said first mentioned support and rotated into the position first occupied by said first mentioned support, said supports being recessed between their ends to receive a row of plates.

6. A pasting table according to claim 4 in which said supports are provided with a longitudinal rib extending between said end blocks.

7. A pasting table comprising a supply table, a plate table, and a pair of removable plate supports arranged to be placed face to face and rotated together and alternatively supported intermediate said supply and plate tables.

8. A pasting table comprising a supply table, a plate table, and a waste trough connecting said tables, and a pair of removable plate supports arranged to be placed face to face and rotated together and alternatively be supported intermediate said supply and plate tables above said waste trough.

WILLIAM H. NORDHAUS.